United States Patent
Fisher et al.

(10) Patent No.: US 9,578,735 B2
(45) Date of Patent: Feb. 21, 2017

(54) EMBEDDED VENTING SYSTEM

(71) Applicant: International Business Machines Corporation, Armonk, NY (US)

(72) Inventors: Michael J. Fisher, Poughkeepsie, NY (US); Roger S. Krabbenhoft, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/797,323

(22) Filed: Jul. 13, 2015

(65) Prior Publication Data

US 2017/0019986 A1    Jan. 19, 2017

(51) Int. Cl.
*H05K 1/02* (2006.01)
*H05K 3/40* (2006.01)
*H03K 19/003* (2006.01)
*G06F 21/70* (2013.01)

(52) U.S. Cl.
CPC ..... *H05K 1/0275* (2013.01); *H03K 19/00369* (2013.01); *H05K 1/0272* (2013.01); *H05K 3/4038* (2013.01)

(58) Field of Classification Search
CPC .. H05K 1/0275; H05K 1/0272; H05K 3/4038; H05K 3/42; H03K 19/17768; H03K 19/00369; G06F 21/70; G06F 21/75; G06F 21/10
USPC .......................................................... 326/8
See application file for complete search history.

(56) References Cited

U.S. PATENT DOCUMENTS

| | | | |
|---|---|---|---|
| 6,431,212 B1* | 8/2002 | Hayenga | B01D 11/00 137/855 |
| 6,787,443 B1* | 9/2004 | Boggs | H05K 1/116 29/852 |
| 7,214,874 B2 | 5/2007 | Dangler et al. | |
| 7,323,986 B2 | 1/2008 | Hunter et al. | |
| 7,787,256 B2 | 8/2010 | Chan et al. | |
| 8,287,336 B2* | 10/2012 | Dangler | 454/184 |
| 2003/0064546 A1* | 4/2003 | McCormick | H05K 3/3436 438/108 |
| 2003/0096081 A1* | 5/2003 | Lavallee | B01F 13/0059 428/138 |
| 2005/0213305 A1 | 9/2005 | Martin et al. | |
| 2012/0281364 A1* | 11/2012 | Gunderson | H05K 5/0256 361/714 |

(Continued)

OTHER PUBLICATIONS

Chowdhury et al., On-Chip Cooling by Superlattice-Based Thin-Film Thermoelectrics, Nature Nanotechnology, Jan. 25 2009, vol. 4, 4 Pages.

(Continued)

*Primary Examiner* — Dylan White
(74) *Attorney, Agent, or Firm* — Lieberman & Brandsdorfer, LLC

(57) ABSTRACT

The embodiments relate to integrating a venting system in a circuit board. Three or more interconnected accesses (VIAs) are formed in a printed circuit board (PCB). The VIAs are interconnected by routing a bi-planar channel spanning through the VIAs. The channel includes at least two sections, including a first channel section at a first plane extending from the first VIA to the second VIA and a second channel section at a second plane extending from the second VIA to the third VIA. The first and second sections are at different planar levels.

20 Claims, 6 Drawing Sheets

(56) References Cited

U.S. PATENT DOCUMENTS

2015/0201499 A1* 7/2015 Shinar .................... H05K 3/125
425/132
2016/0095227 A1* 3/2016 Takano ................ H05K 3/4611
156/247

OTHER PUBLICATIONS

Bar-Cohen et al., On-Chip Hot Spot Remediation with Miniaturized Thermoelectric Coolers, Microgravity Science and Technology, 2009, pp. 1-9.
Mo et al., Integrating Nano Carbontubes with Microchannel Cooler, High Density Microsystem Design and Packaging and Component Failure Analysis, 2004, Proceeding of the Sixth IEEE CPMT Conference on IEEE, 2004, pp. 373-376.

* cited by examiner

EMBEDDED VENTING SYSTEM

BACKGROUND

The embodiments described herein relate to a printed circuit board (PCB) in the form of a cryptographic module. More specifically, the embodiments relate to associating a protocol with the PCB to enable security and to mitigate tampering of the cryptographic module.

Federal Information Processing Standards 140-2 (hereinafter "FIPS") recite requirements that computer systems should meet for Sensitive but Unclassified (SBU) use, as defined by the United States federal government. Specifically, FIPS defines security requirements that must be satisfied by a cryptographic module used in a security system protecting unclassified information within computer systems. FIPS has four levels of security, ranging from Level 1 (lowest) to Level 4 (highest). At Level 4, hereinafter referred to as FIPS-4, the physical security mechanisms provide a complete envelope of protection around the cryptographic module with the intent of detecting and responding to all unauthorized attempts at physical access. Penetration of the cryptographic module enclosure subject to FIPS-4 has a very high probability of being detected, resulting in the immediate nullification of all critical security parameters stored in the module.

One such cryptographic module is a circuit board embedded with logic used to encrypt data traffic (i.e., cryptographic logic). For example, the circuit board may be a printed circuit board (PCB). As a security measure, the portion of the PCB embedded with the cryptographic logic may be enclosed within a protective sleeve, also referred to herein as an enclosure. The enclosure provides security (e.g., mechanical, electronic, etc.) to prevent unwanted access to the logic, such that a person is unable to read, destroy, or otherwise tamper with the cryptographic logic. The enclosure may also contain an internal sensor to detect such tamper attempts.

SUMMARY

The aspects described herein include a system and a computer program product for a printed circuit board (PCB) with an integrated venting system.

According to one aspect, a system is provided. The system includes a printed circuit board (PCB) having a first area and a second area. The PCB includes at least three interconnected accesses (VIAs) bounded by oppositely disposed sides of the PCB. The VIAs are positioned with respect to the first and second areas. The system further includes a venting system integrated within the PCB. The venting system includes an interconnection of the at least three VIAs, and a bi-planar channel spanning through the VIAs. The channel includes at least two sections, including a first section extending from the first VIA to the second VIA and a second section extending from the second VIA to the third VIA. The first and second sections are at different planar levels. The advantage of the integrated venting system pertains to establishment of a security protocol when the PCB is at least partially housing within an enclosure. A sensor is provided internal to the enclosure, and functions to detect tampering with the PCB. The integrated venting system functions to maintain an isobaric environment between a portion of the PCB that is housed within the enclosure and atmospheric pressure, and functions with the sensor to mitigate detection of a false tampering. In one embodiment, it is advantageous to position the VIAs in relation to embedded logic, such as positioning an area of the PCB which comprises the embedded logic within an enclosure. More specifically, the first VIA may be positioned outside of the enclosure, and the third VIA may be positioned within the enclosure, thereby preventing tampering with the embedded logic.

According to another aspect, a computer program product is provided for integrating a venting system in a circuit board. The computer program product includes a computer readable storage device having program code embodied therewith, the program code executable by a processing unit to form at least three interconnected accesses (VIAs) in a printed circuit board (PCB), which are bounded by oppositely disposed sides of the PCB. Program instructions integrate a venting system within the PCB. The integration includes interconnecting the at least three VIAs, and routing a bi-planar channel spanning through the VIAs. The channel includes at least two sections, including a first section extending from the first VIA to the second VIA and a second section extending from the second VIA to the third VIA. The first and second sections are at different planar levels. The advantage of the integrated venting system pertains to establishment of a security protocol when the PCB is at least partially housing within an enclosure. A sensor is provided internal to the enclosure, and functions to detect tampering with the PCB. The integrated venting system functions to maintain an isobaric environment between a portion of the PCB that is housed within the enclosure and atmospheric pressure, and functions with the sensor to mitigate detection of a false tampering. In one embodiment, it is advantageous to position the VIAs in relation to embedded logic, such as positioning an area of the PCB which comprises the embedded logic within an enclosure. More specifically, the first VIA may be positioned outside of the enclosure, and the third VIA may be positioned within the enclosure, thereby preventing tampering with the embedded logic.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

Figure 1:
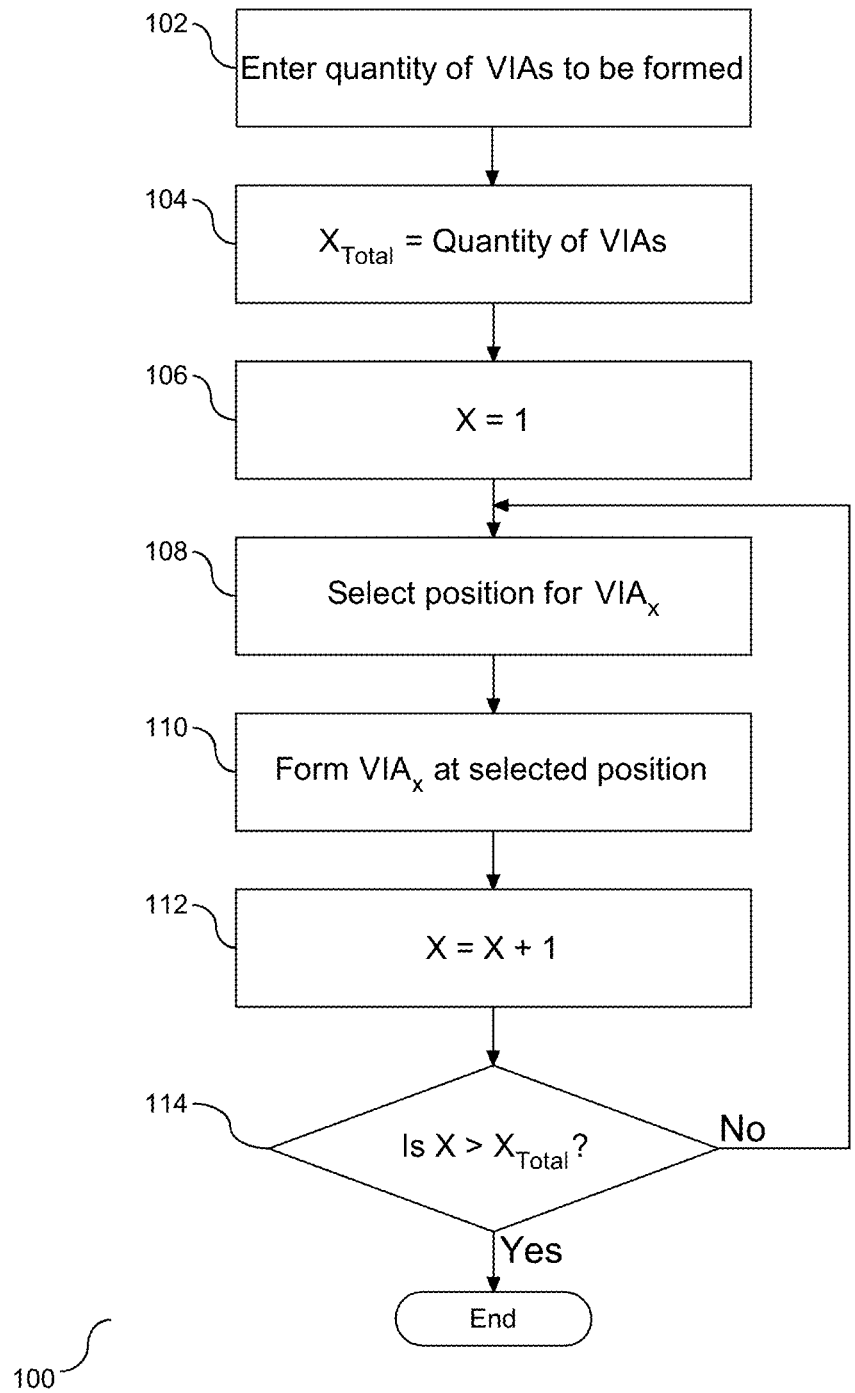
FIG. 1 depicts a flowchart illustrating a method in accordance with an embodiment.

It will be readily understood that the components of the embodiments, as generally described and illustrated in the Figures herein, may be arranged and designed in a wide variety of different configurations. Thus, the following detailed description of the embodiments of the system and the method, as presented in the Figures, is not intended to limit the scope of the embodiments, as claimed, but is merely representative of the selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A printed circuit board (PCB) is configured to receive electronic components. The PCB is comprised of multiple layers that interconnect components. Pathways are etched or printed onto the board to connect different components on the board. There components may include, but are not limited to, transistors, resistors, and integrated circuit(s). In one embodiment, the pathway may be a vertical interconnect access (VIA) that functions as a pathway between two or more substrate layers. The VIA is created by drilling through the PCB at an appropriate location where two or more layers will interconnect. In one embodiment, the VIA is a conductive pathway and is lined with a conductive material, such as copper. The VIA may take the form of either a conductive or non-conductive entity, i.e. a copper plated VIA or a non-plated VIA. The copper plated VIAs are for conductive paths related to passing signals from one area to another. The non-plated VIAs are typically mechanical in nature to help locate a connected body, align two entities, etc. Similarly, in one embodiment, the VIA extends through each of the layers of the PCB. Accordingly, the formation of the VIA is integral to the pathway formation.

The PCB may be enclosed by a sleeve or other enclosure to protect cryptographic logic embedded on the board. The enclosure may be configured with one or more security measures, such as an internal sensor to detect such tamper attempts. If the enclosure is sealed, as is required in designing a FIPS-4 compliant module, a pressure difference is established between the inside of the enclosure and the atmospheric pressure outside of the enclosure. Without a means to reduce this pressure difference, the sensor is susceptible to detect false tamper attempts and is at risk of failure due to mechanical deformation. Accordingly, a venting system may be implemented to maintain equilibrium between the internal pressure of a sealed enclosure and the external pressure (i.e., to maintain an isobaric environment).

With reference to FIG. 1, a flow chart (100) is provided illustrating a first stage of a method for integrating a venting system into the PCB. More specifically, the method depicted forms interconnected accesses (VIAs) in the PCB. The quantity of VIAs to be formed in the PCB is entered (102). The VIAs being formed herein are configured and placed to support security protocols. In one embodiment, the VIAs being formed are channels that extend through at least two layers of the PCB. In one embodiment, at least three VIAs are formed as a minimum quantity of VIAs to support the security protocol.

The quantity of VIAs is assigned to the variable $X_{TOTAL}$ (104), and an associated VIA counting variable X is initialized (106). To support the security protocols, the VIAs are positioned so that they do not interfere with any logic embedded within the layers of the PCB. At the same time, positioning of the VIAs is critical to the security protocol. As such, there are at least two criteria that must be supported for positioning each of the VIAs, with one criteria directed to maintaining the function of the PCB and requires that the VIA does not interfere with any logic embedded within the layers of the PCB, and the second criteria directed to supporting the security protocol of the PCB. In one embodiment, the security protocol is directed to an enclosure to house the PCB, with the enclosure configured to prevent tampering with the PCB and any associated logic, e.g. cryptographic logic. The security protocols described herein related to venting system integrated within the PCB, the details of which will be discussed below in the context of FIG. 2. For each VIA being created, a position of $VIA_X$ is selected (108). The position of the $VIA_X$ is selected in relation to both the enclosure and the logic embedded within the layers of the PCB. As articulated above, the VIA placement is benign so that there is no interference with the logic embedded within the layers of the PCB. Accordingly, placement of each VIA is multi-factorial in that the placement must not interfere with the functionality of the PCB, while also supporting the functionality of the security protocols.

As will be described in detail in the Figures below, at least three VIAs are created in a PCB configured to be placed in a tamper resistant enclosure, hereinafter referred to as an enclosure. In a three VIA embodiment, as described in detail in FIGS. 4 and 5, a first VIA, $VIA_1$, is positioned outside of the enclosure and a third VIA, $VIA_3$, is selected to be positioned within the enclosure. A second VIA, $VIA_2$, is selected to be positioned between $VIA_1$ and $VIA_3$ in accordance with the embodiments described herein. In one embodiment, $VIA_2$ is positioned within the enclosure. In a four VIA embodiment, as described in detail in FIGS. 6 and 7, a first VIA, $VIA_1$, is positioned outside of the enclosure and a fourth VIA, $VIA_4$, is selected to be positioned within the enclosure. Second and third VIAs, $VIA_2$ and $VIA_3$, respectively, are selected to be positioned between $VIA_1$ and $VIA_4$ in accordance with the embodiments described herein. In one embodiment, $VIA_2$ and $VIA_3$ are positioned within the enclosure.

Referring to FIG. 1, following the selection and positioning of $VIA_X$ at (108), $VIA_X$ is formed in the PCB (110). As is known in the art, a VIA is a connection, either conductive or non-conductive, between layers of a circuit board formed by drilling, or otherwise inserting a through-hole within the PCB. In one embodiment, $VIA_X$ is bounded by oppositely disposed sides of the PCB. As is known in the art, a VIA goes through the plane of one or more adjacent layers of the circuit board. Accordingly, it is to be appreciated and understood that $VIA_X$ may or may not traverse through every layer of the PCB.

Following step (110), the counting variable X is updated (112) and it is determined if all of the VIAs have been positioned and formed, i.e. X is greater than $X_{TOTAL}$ (114).

A negative response to the determination at step (114) causes the process to return to step (108) to select the placement of the next VIA. However, a positive response to the determination at step (114) is an indication that all the VIAs have been formed in the PCB. The process that ends at step (114) is also known as the first stage. Accordingly, the first stage addresses the positioning and creation of the VIAs that form part of the integrated venting system.

Following completion of the first stage as demonstrated in FIG. 1, the process of forming the security mechanism proceeds to the second stage of the process which includes integrating a venting system within the PCB, as shown and described with reference to FIG. 2. More specifically, the second stage employs the VIAs formed at the first stage.

Figure 2:
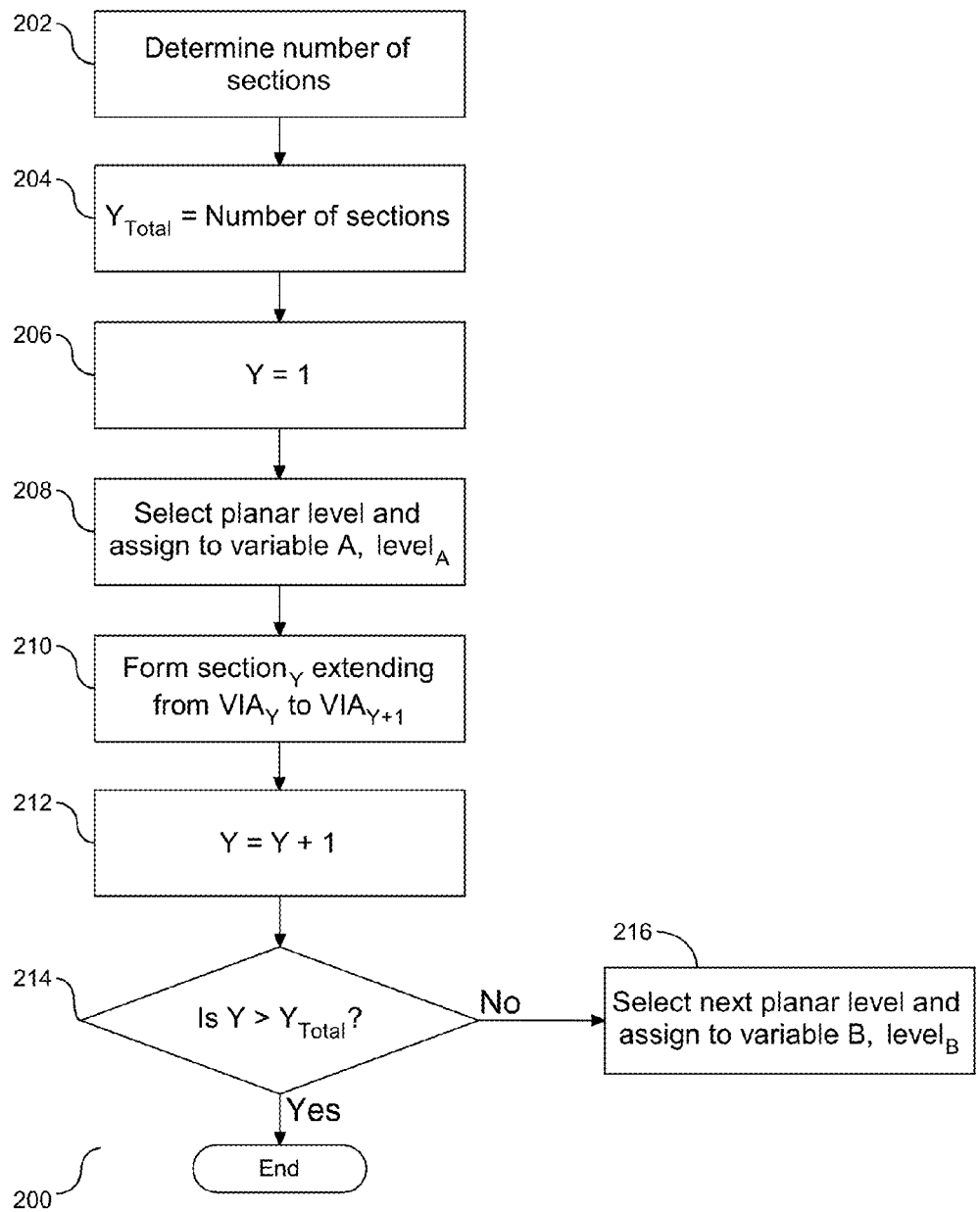
FIG. 2 depicts a flowchart illustrating a method in accordance with an embodiment.

Referring to FIG. 2, a flow chart (200) is provided illustrating a process for routing a bi-planar channel spanning through the VIAs formed through the process shown and described in FIG. 1. The channel is composed of multiple sections, with each section serving to connect two adjacently position VIAs. The number of sections is determined (202) and is then assigned to the variable $Y_{TOTAL}$ (204). It mathematically follows that the number of sections is one less than the quantity of VIAs formed at the first stage, i.e., $Y_{TOTAL} = X_{TOTAL} - 1$. A section counting variable Y is initialized (206). In addition, a planar level in the PCB is selected and assigned to the variable A (208), where $level_A$ is within one of the layers of the PCB. Based on the mathematical relationship between VIAs and sections, $VIA_X$ may also be referred to as $VIA_{Y+1}$, and $section_Y$ is formed with an associated length extending from $VIA_Y$ to $VIA_{Y+1}$ (210). For example, $section_1$ is formed with an associated length extending from $VIA_1$ to $VIA_2$. Accordingly, the quantity of sections is one less than the quantity of VIAs and each section connects two adjacently positioned VIAs.

After $section_Y$ is formed at step (210), the section counting variable Y is incremented (212), followed by determining if all of the sections designated for the implementation of the channel have been formed, i.e. is $Y > Y_{TOTAL}$ (214). A negative response to the determination at step (214) is followed by selecting a planar level in the PCB and assigning the selected level to the variable B (216), where $level_B$ is within the layers of the PCB and B is different from A. Following step (216), the process returns to step (210) to form the next section. As demonstrated, $section_{Y+1}$ is formed at a different planar level than $section_Y$. In other words, $section_Y$ is formed at a first planar level and $section_{Y+1}$ is formed at a second planar level, with the first and second planar levels being different. For example, $section_2$ is formed at a different planar level than $section_1$, with $section_1$ at a first plane and $section_2$ at a second plane. In the case that the number of VIAs is greater than 3, $section_3$ may be formed at a third plane either at the same planar level as $section_1$ and a different planar level from $section_2$, or at a different planar level from both $section_1$ and $section_2$.

At such time as there is a positive response to the determination at step (214), the formation of the sections concludes, thereby forming the complete channel. Accordingly, a channel having two or more sections is formed in the venting configuration of the PCB, with at least two of the sections being formed at different planar levels.

As shown and described in FIG. 2, $section_Y$ extends from VIA to $VIA_{Y+1}$, and $section_{Y+1}$ extends from $VIA_{Y+1}$ to $VIA_{Y+2}$. That is, $section_Y$ and $section_{Y+1}$ both occupy $VIA_{Y+1}$, and are connected by the path formed by a portion of the opening in $VIA_{Y+1}$ between $section_Y$ and $section_{Y+1}$. Due to $section_Y$ and $section_{Y+1}$ being formed at different planar levels, the path connecting $section_Y$ and $section_{Y+1}$ within $VIA_{Y+1}$ is angled with respect to the respective planes of $section_Y$ and $section_{Y+1}$. This path may be visualized as a bend in the channel. In one embodiment, the bend is orthogonal to the respective planes of the sections. Accordingly, three components are formed and positioned within the PCB to comprise the venting configuration, including three or more VIA's, two or more channels, and two or more bends to form a connection between the respective VIAs and channels.

The routing of the channel through the VIAs formed within the PCB, as described above with reference to FIGS. 1 and 2, creates an integrated venting system within the PCB. In one embodiment, the VIAs formed within the PCB function as vents of the integrated venting system, and the routing of the channel through the VIAs creates an isobaric venting system to maintain an equilibrium pressure between the inside of the PCB and the surrounding atmosphere. Accordingly, FIGS. 1 and 2 illustrate a method to manufacture a PCB with an integrated venting system.

Figure 3:
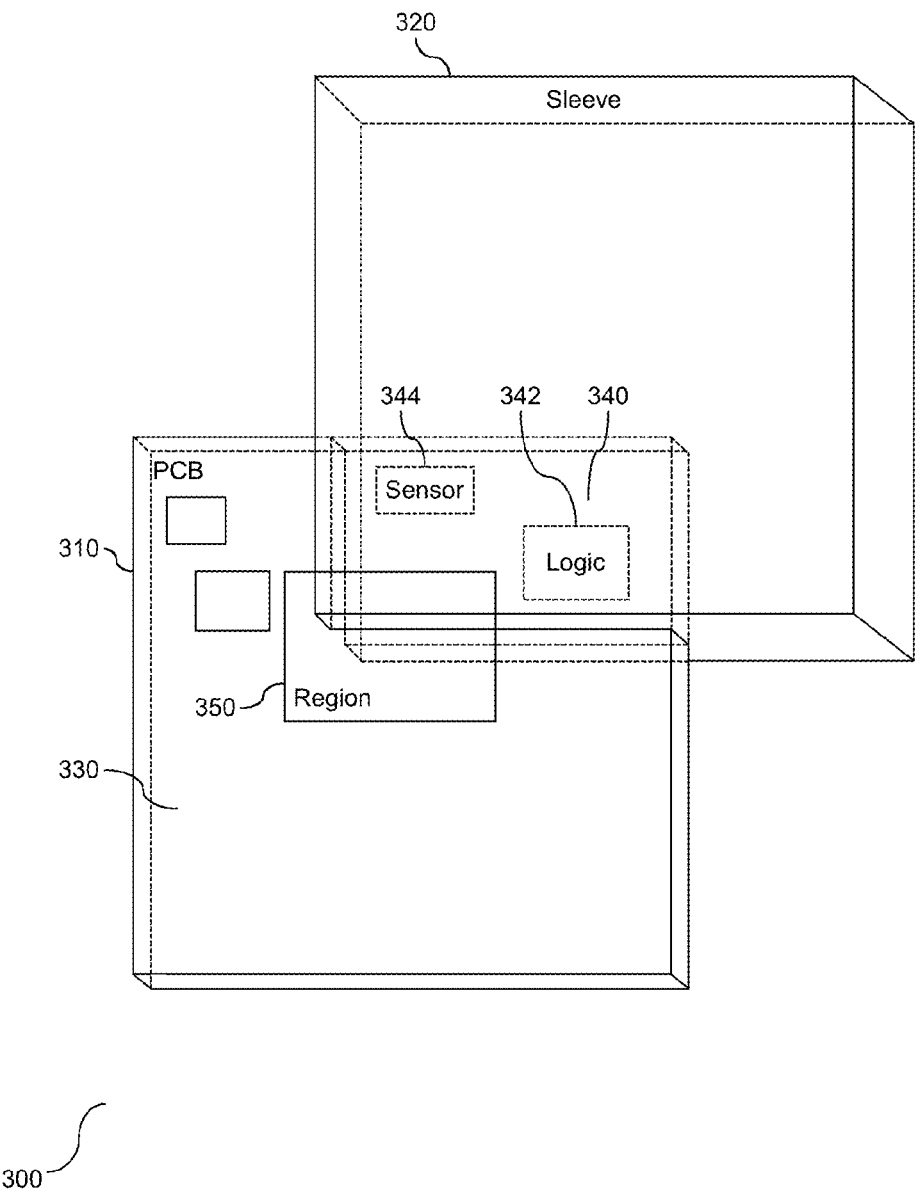
FIG. 3 depicts a perspective view of a PCB in accordance with an embodiment.

With reference to FIG. 3, a perspective view (300) of a PCB is shown prior to the integration of a venting system. As shown, the PCB (310) is partially covered by a sleeve (320). More specifically, the PCB includes two areas, including a first area (330) that is external to the sleeve (320), and a second area (340) that is covered by the sleeve (320). In one embodiment, the first area of the PCB (330) is subject to atmospheric pressure. As shown, logic (342) is embedded within the second area of the PCB (340). In one embodiment, the sleeve (320) is configured to prevent unwanted access (i.e., tampering) to the logic (342). As shown, a sensor (344) may be embedded within the second area of the PCB (340). In one embodiment, the sensor (344) detects unwanted attempts to mechanically or electronically access, or otherwise tamper with, the logic (342).

As shown, region (350) represents one possible region of the PCB in which a venting system (not shown) may be integrated in accordance with the method as described above with reference to FIGS. 1 and 2. It is to be understood that the integration of the venting system is not limited to region (350). One skilled in the art will appreciate that the venting system may be integrated in any region of the PCB in accordance with the embodiments described herein.

Examples of a PCB or similar system that may be manufactured in accordance with the method depicted in FIGS. 1 and 2 are described below with reference to FIGS. 4-7. In one embodiment, the PCB (310) has at least three VIAs configured within the venting system. It is to be appreciated that the embodiments are not limited to the embodiments described below with reference to FIGS. 4-7.

Figure 4:
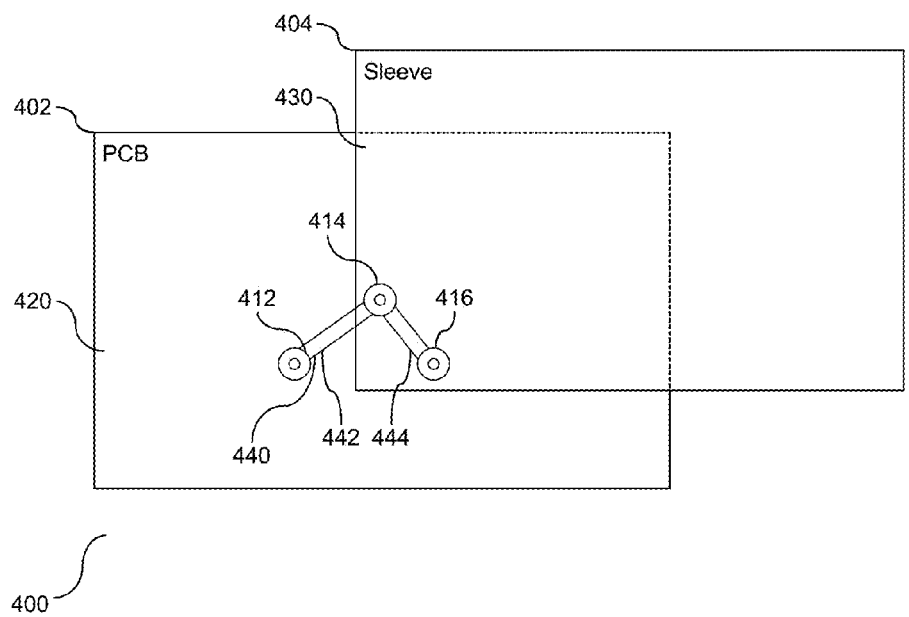
FIG. 4 depicts a top view of a PCB with an integrated venting system in accordance with an embodiment.

Referring to FIG. 4, a top view (400) of a PCB with an integrated ventilation system is shown. The PCB (402) is provided and shown as partially housed within a sleeve (404), also referred to herein as an enclosure. Three VIAs are depicted in the embodiment shown and described herein, including a first VIA (412), a second VIA (414), and a third VIA (416). In one embodiment, the VIAs (412)-(416) are positioned in relation to the enclosure (404). At the same time, the PCB has at least two different areas with respect to the sleeve (404), including a first area of the PCB (420) that is external to the sleeve (404), hereinafter referred to as the external area, and a second area of the PCB (430) that is covered or otherwise enclosed by the sleeve (404), hereinafter referred to as the covered area. The first VIA (412) is positioned within the external area (420), and the second VIA (414) and third VIA (416) are both positioned within the covered area (430). Accordingly, the VIAs are positioned with respect to one area of the PCB received within the enclosure and one area of the PCB remaining external to the enclosure.

As further shown, the PCB (402) is further configured with a channel (440) routed through VIAs (412)-(416). In one embodiment, channel (440) is a bi-planar channel spanning VIAs (412)-(416). Details of the bi-planar configuration of the channel (440) is shown and described in FIG. 5. The channel (440) includes two sections, referred to herein as a first section (442) and a second section (444). As shown, first and second sections (442) and (444) are at different planar levels within the channel (440). In one embodiment, the first section (442) is located a first plane (not shown) and the second section (444) is located at a second plane (not shown), with the first and second planes being at different planar levels. The first section (442) extends from VIA (412) to VIA (414), and the second section (444) extends from VIA (414) to VIA (416).

The routing of the channel (440), and specifically the first and second sections (442) and (444), respectively, through VIAs (412)-(416), creates a venting system (460) integrated within the PCB. In one embodiment, each VIA (412)-(416) together with the channel (440) and associated sections (442) and (444) functions as a venting system, and the venting system is an isobaric venting system.

Figure 5:
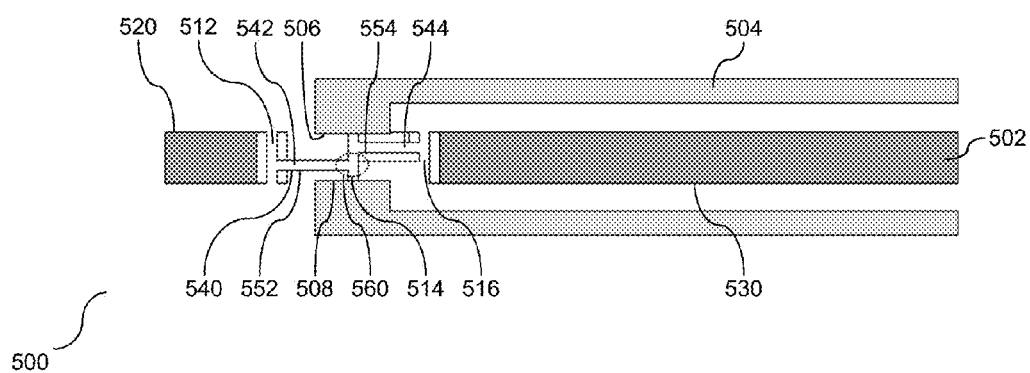
FIG. 5 depicts a cross-sectional view of a PCB with an integrated venting system in accordance with an embodiment.

Referring to FIG. 5, a cross-sectional view (500) of the venting system of FIG. 4 is shown and described. A PCB (502) is partially housed within an enclosure (504) so that two areas of the PCB are defined with respect to the enclosure. Specifically, area (520) is the portion of the PCB (502) that is external to the enclosure (504), hereinafter referred to as the external area, and area (530) is the portion of the PCB (502) covered or otherwise enclosed by the enclosure (504), hereinafter referred to as the covered area. As shown, PCB (502) includes three VIAs, depicted as a first VIA (512), a second VIA (514), and a third VIA (516). As shown, enclosure (504) includes two oppositely disposed surfaces (506) and (508) that form a boundary. The PCB (502), and the VIAs (512)-(516) formed within the PCB are bounded by the surfaces (506) and (508) of the enclosure (504).

As shown, a channel (540) is routed through the VIAs (512)-(516). In one embodiment, channel (540) is a bi-planar channel spanning VIAs (512)-(516). To address the bi-planar configuration, channel (540) includes a first channel section (542), hereinafter referred to as a first section (542), extending from the first VIA (512) to the second VIA (514), and a second channel section (544), hereinafter referred to as a second section (544), extending from the second VIA (514) to the third VIA (516).

As shown, the first and second sections (542) and (544), respectively, are at different planar levels within the channel (540). In one embodiment, the first section (542) is located at a first plane (552), and the second section (544) is located at a second plane (554), with the first and second planes (552) and (554), respectively, being at different planar levels. As shown, the second VIA (514) provides a connection between the first section (542) and the second section (544). The connection between sections (542) and (544) results in a bend (560) in the channel (540) due to the sections (542) and (544) being at different planar levels. In one embodiment, the bend (560) is orthogonal with respect to the planes of both sections (542) and (544). Accordingly, the channel (540) routed through VIAs (512)-(516) includes first section (542), second section (544), and bend (560).

The routing of channel (540), and specifically the first and second sections (542) and (544), respectively, through VIAs (512)-(516), creates a venting system integrated within the PCB (502). In one embodiment, each VIA (512)-(516) functions as a vent of the venting system, and the venting system is an isobaric venting system.

Figure 6:
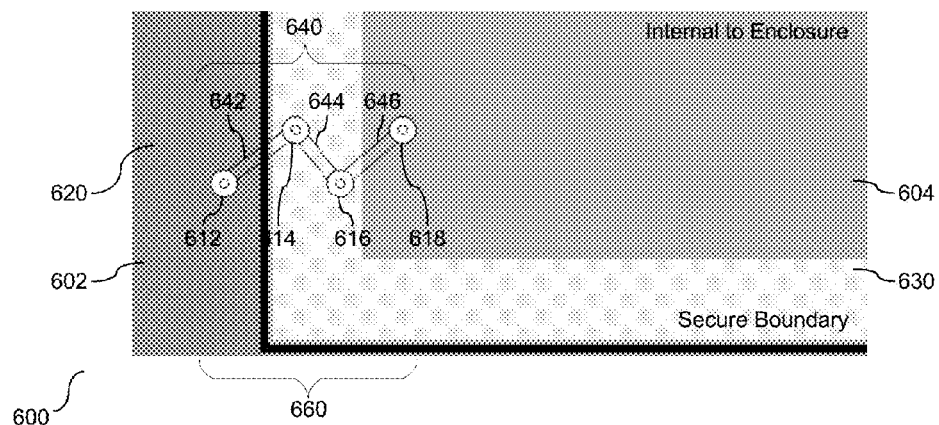
FIG. 6 depicts a top view of a PCB with an integrated venting system in accordance with an alternative embodiment.

Referring to FIG. 6, a top view (600) of a PCB with an integrated ventilation system is shown. The PCB (602) is provided and shown as partially housed within a sleeve (604), also referred to herein as an enclosure. Four VIAs are depicted in the embodiment shown and described herein, including a first VIA (612), a second VIA (614), a third VIA (616), and a fourth VIA (618). In one embodiment, the VIAs (612)-(618) are positioned in relation to the enclosure (604). At the same time, the PCB has at least two different areas with respect to the sleeve (604), including a first area of the PCB (620) that is external to the sleeve (604), hereinafter referred to as the external area, and a second area of the PCB (630) that is covered or otherwise enclosed by the sleeve (604), hereinafter referred to as the covered area. The first VIA (612) is positioned within the external area (620) and VIAs (614)-(618) are positioned within the covered area (630). Accordingly, the VIAs are positioned with respect to one area of the PCB within the enclosure and one area of the PCB remaining external to the enclosure.

As further shown, the PCB (602) is further configured with a channel (640) routed through VIAs (612)-(618). In one embodiment, channel (640) is a bi-planar channel spanning through VIAs (612)-(618). Details of the bi-planar configuration of the channel (640) is shown and described in FIG. 7. As shown, channel (640) includes three sections, referred to herein as a first section (642), a second section (644), and a third section (646). The first and second sections (642) and (644), respectively, are at different planar levels within the channel (640), and the second and third sections (644) and (646), respectively, are at different planar levels within the channel (640). In one embodiment, the first section (642) is located at a first plane (not shown), the second section (644) is located at a second plane (not shown), and the third section (646) is located at a third plane (not shown). The first and second planes and the second and third planes, respectively, are located at different planar levels. It is to be understood that there is no requirement that the first section (642) and the third section (646) be at the same planar level or different planar levels. The first section (642) extends from VIA (612) to VIA (614), the second section (644) extends from VIA (614) to VIA (616), and third section (646) extends from VIA (616) to VIA (618).

The routing of channel (640), and specifically the sections (642)-(646), respectively, through VIAs (612)-(618), creates a venting system (660) integrated within the PCB. In one embodiment, each VIA (612)-(618) functions as a vent of the venting system (660), and the venting system (660) is an isobaric venting system.

Figure 7:
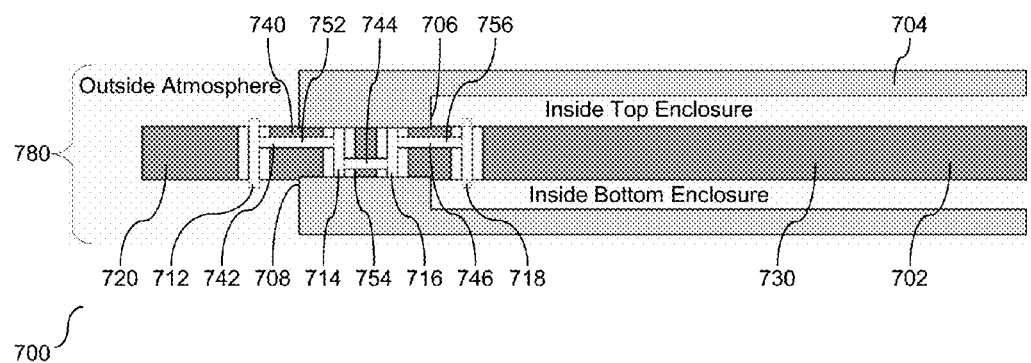
FIG. 7 depicts a cross-sectional view of a PCB with an integrated venting system in accordance with an alternative embodiment.

Referring to FIG. 7, a cross-sectional view (700) of the venting system of FIG. 6 is shown and described. A PCB (702) is partially housed within an enclosure (704) so that two areas of the PCB are defined with respect to the enclosure. Specifically, area (720) is the portion of the PCB (702) that is external to the enclosure (704), hereinafter referred to as the external area, and area (730) is the portion of the PCB (702) covered or otherwise enclosed by the enclosure (704), hereinafter referred to as the covered area. As shown, PCB (702) includes four VIAs, depicted as a first VIA (712), a second VIA (714), a third VIA (716), and a fourth VIA (718). As shown, enclosure (704) includes two oppositely disposed surfaces (706) and (708) that form a boundary. The PCB (702), and the VIAs (712)-(718) formed within the PCB are bounded by the surfaces (706) and (708) of the enclosure (704).

As shown, a channel (740) is routed through the VIAs (712)-(718). In one embodiment, channel (740) is a bi-planar channel spanning the VIAs (712)-(718). To address the bi-planar configuration, channel (740) includes a first channel section (742), hereinafter referred to as a first section (742), extending from the first VIA (712) to the second VIA (714), a second channel section (744), hereinafter referred to as a second section (744), extending from the second VIA (714) to the third VIA (716), and a third channel section (746), hereinafter referred to as a third section (746), extending from the third VIA (716) to the fourth VIA (718).

As shown, the first and second sections (742) and (744), respectively, and the second and third sections (744) and (746), respectively, are at different planar levels within the channel (740). In one embodiment, the first section (742) is located at a first plane (752), the second section (744) is located at a second plane (754), and the third section (746) is located at a third plane (756). The first and second planes (752) and (752), respectively, and the second and third planes (754) and (756), respectively, are located at different planar levels.

As further shown, the first and third sections (742) and (746) are at the same planar level within the channel (740). In one embodiment, the first section (742) is located at the first plane (752), the second section (744) is located at the second plane (754), and the third section (746) is located at the third plane (756), such that the first plane (752) is at a different planar level than the second plane (754), the second plane (754) is at a different planar level than the third plane (756), and the third plane (756) is at the same planar level as the first plane (752). In another embodiment, the first plane (752) is at a different planar level than the second plane (754), the second plane (754) is at a different planar level than the third plane (756), and the third plane (756) is at a different planar level than both the first and second planes (752) and (754), respectively. It is to be understood that there is no requirement that the first section (742) and the third section (746) be at the same or different planar level. Accordingly, the third section (746) is at a different planar level than at least the second section (744).

As shown, the second VIA (714) provides a connection between the first section (742) and the second section (744), and the third VIA (716) provides a connection between the second section (744) and the third section (746). The connection between sections (742) and (744) results in a first bend (760) in the channel (740) due to the sections (742) and (744) being at different planar levels. Similarly, the connection between section (744) and section (746) results in a second bend (770) in the channel (740) due to sections (744) and (746) being at different planar levels. In one embodiment, the first bend (760) is orthogonal with respect to the planes of both section (742) and section (744), and the second bend (770) is orthogonal with respect to the planes of both section (744) and section (746). Accordingly, the channel (740) routed through VIAs (712)-(718) includes sections (742)-(746), and bends (760) and (770).

The routing of channel (740) through VIAs (712)-(718), and specifically the sections (742)-(746), respectively, through VIAs (712)-(718), creates a venting system (780) integrated within the PCB (702). In one embodiment, each VIA (712)-(718) functions as vents of the venting system (780), and the venting system (780) is an isobaric venting system.

As will be appreciated by one skilled in the art, the embodiments described herein may be embodied as a method, a system, or a computer program product. Accordingly, aspects of the embodiments may take the form of an entirely hardware embodiment, an entirely software embodiment (including firmware, resident software, micro-code, etc.) or an embodiment containing software and hardware aspects. Furthermore, aspects of the embodiments may take the form of a computer program product embodied in one or more computer readable medium(s) having computer readable program code embodied thereon.

The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The aspects are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing system to produce a machine, such that the instructions, which execute via the processor of the computer or other programmable data processing system, create means for implementing the functions/acts specified in the flowchart and/or block diagram block or blocks. These computer readable program instructions may also be stored in a computer readable storage medium that can direct a computer, a programmable data processing system, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing system, or other device to cause a series of operational steps to be performed on the computer, other programmable system or other device to produce a computer implemented process, such that the instructions which execute on the computer, other programmable system, or other device implement the functions/acts specified in the flowchart and/or block diagram block or blocks.

The flowchart and block diagrams in the Figures illustrate the architecture, functionality, and operation of possible implementations of methods, systems, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles and the practical application, and to enable others of ordinary skill in the art to understand the various embodiments with various modifications as are suited to the particular use contemplated. Accordingly, the implementation of a method to manufacture a PCB with an integrated venting system, and the corresponding system, are not limited to the embodiments described above. It will be appreciated that, although specific embodiments of the invention have been described herein for purposes of illustration, various modifications may be made without departing from the spirit and scope of the invention. For instance, alternative embodiments may include forming PCBs with more than four VIAs. Accordingly, the scope of protection of this invention is limited only by the following claims and their equivalents.

Furthermore, the described features, structures, or characteristics may be combined in any suitable manner in one or more embodiments. In the following description, numerous specific details are provided, such as examples of enclosures, VIAs, and channels, to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

Figure 8:
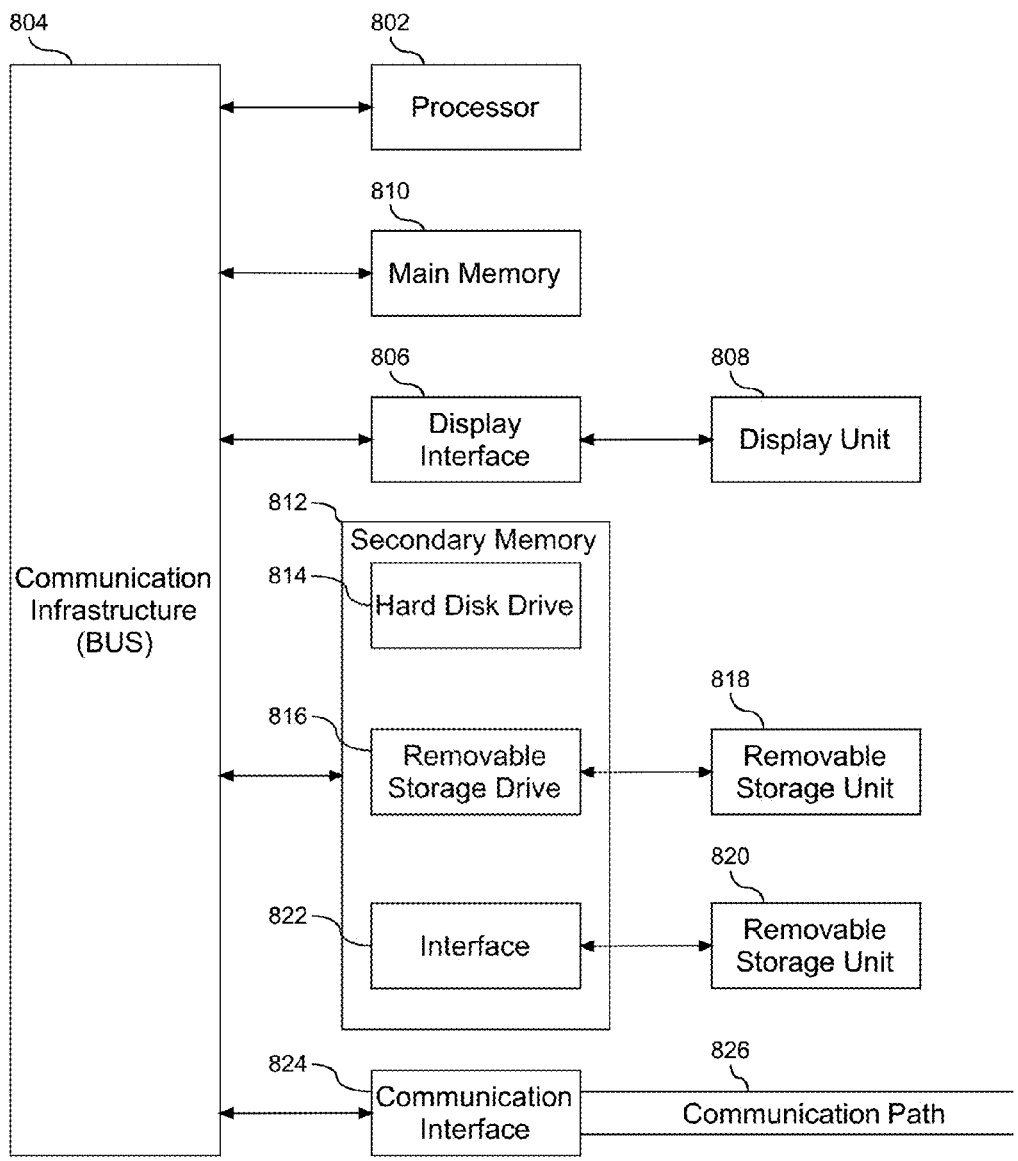
FIG. 8 depicts a block diagram of a computer system and associated components for implementing an embodiment.

Referring now to the block diagram of FIG. 8, additional details are now described with respect to implementing an embodiment. For example, in one embodiment, the computer system described herein may be employed to with computer program instructions to create and assemble the venting system integrated into the PCB. The computer system includes one or more processors, such as a processor (802). The processor (802) is connected to a communication infrastructure (804) (e.g., a communications bus, cross-over bar, or network).

The computer system can include a display interface (806) that forwards graphics, text, and other data from the communication infrastructure (804) (or from a frame buffer not shown) for display on a display unit (808). The computer system also includes a main memory (810), preferably random access memory (RAM), and may also include a secondary memory (812). The secondary memory (812) may include, for example, a hard disk drive (814) and/or a removable storage drive (816), representing, for example, a floppy disk drive, a magnetic tape drive, or an optical disk drive. The removable storage drive (816) reads from and/or writes to a removable storage unit (818) in a manner well known to those having ordinary skill in the art. Removable storage unit (818) represents, for example, a floppy disk, a compact disc, a magnetic tape, or an optical disk, etc., which is read by and written to by removable storage drive (816).

In alternative embodiments, the secondary memory (812) may include other similar means for allowing computer programs or other instructions to be loaded into the computer system. Such means may include, for example, a removable storage unit (820) and an interface (822). Examples of such means may include a program package and package interface (such as that found in video game devices), a removable memory chip (such as an EPROM, or PROM) and associated socket, and other removable storage units (820) and interfaces (822) which allow software and data to be transferred from the removable storage unit (820) to the computer system.

The computer system may also include a communications interface (824). Communications interface (824) allows software and data to be transferred between the computer system and external devices. Examples of communications interface (824) may include a modem, a network interface (such as an Ethernet card), a communications port, or a PCMCIA slot and card, etc. Software and data transferred via communications interface (824) is in the form of signals which may be, for example, electronic, electromagnetic, optical, or other signals capable of being received by communications interface (824). These signals are provided to communications interface (824) via a communications path (i.e., channel) (826). This communications path (826) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (810) and secondary memory (812), removable storage drive (816), and a hard disk installed in hard disk drive (814).

Computer programs (also called computer control logic) are stored in main memory (810) and/or secondary memory (812). Computer programs may also be received via a communication interface (824). Such computer programs, when run, enable the computer system to perform the features of the present embodiment(s) as discussed herein. In particular, the computer programs, when run, enable the processor (802) to perform the features of the computer system. Accordingly, such computer programs represent controllers of the computer system.

The present embodiment(s) may be a system, a method, and/or a computer program product. The computer program product may include a computer readable storage medium (or media) having computer readable program instructions thereon for causing a processor to carry out aspects of the present embodiment(s).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

It will be appreciated that, although specific embodiments of the invention have been described herein for purposes of illustration, various modifications may be made without departing from the spirit and scope of the invention. In particular, the various components can be arranged in different configuration while supporting a venting system within the confines of the PCB with respect to the enclosure. Accordingly, the scope of protection of this invention is limited only by the following claims and their equivalents.

We claim:

1. A system comprising:
   a printed circuit board (PCB) comprising a first area and a second area, and at least three interconnected accesses (VIAs) bounded by oppositely disposed sides of the PCB, wherein the VIAs are positioned with respect to the first and second areas; and
   a venting system integrated within the PCB, the venting system comprising:
      an interconnection of the at least three VIAs; and
      a channel spanning through the VIAs, the channel comprising at least two sections, including a first section extending from the first VIA to the second VIA and a second section extending from the second VIA to the third VIA, wherein at least one of the first and second sections are positioned within the oppositely disposed sides of the PCB.

2. The system of claim 1, further comprising the second VIA to connect the first section and the second section at a first bend orthogonal to a first plane associated with the first section, and to a second plane associated with the second section.

3. The system of claim 2, wherein each VIA functions as a vent of the venting system, and wherein the channel creates an isobaric venting system.

4. The system of claim 1, further comprising:
   an enclosure to receive at least part of the PCB, wherein the first area of the PCB is positioned within the enclosure and the second area of the PCB is positioned external to the enclosure; and
   logic embedded in the first area, wherein the enclosure is configured to prevent tampering with the embedded logic, and wherein the VIAs are positioned in relation to the embedded logic.

5. The system of claim 4, further comprising the first VIA positioned outside of the enclosure, and the third VIA positioned within the enclosure.

6. The system of claim 4, further comprising a sensor embedded in the first area to detect unwanted access to the embedded logic.

7. The system of claim 1, further comprising a fourth VIA interconnected into the venting system, wherein the channel further comprises a third section extending from the third VIA to the fourth VIA, and wherein the third section is at a different planar level than at least one of the first and second sections.

8. The system of claim 7, wherein the third VIA connects the second section and the third section at a second bend orthogonal to the second plane, and to a third plane associated with the third section.

9. A computer program product for integrating a venting system in a circuit board, the computer program product comprising a computer readable hardware storage medium having program code embodied therewith, the program code executable by a processing unit to:
   form at least three interconnected accesses (VIAs) in a printed circuit board (PCB), the VIAs bounded by oppositely disposed sides of the PCB; and
   integrate a venting system within the PCB, the integration comprising program code to:
      interconnect the at least three VIAs; and
      route a channel spanning through the VIAs, the channel comprising at least two sections, including a first section extending from the first VIA to the second VIA and a second section extending from the second VIA to the third VIA, wherein at least one of the first and second sections are positioned within the oppositely disposed sides of the PCB.

10. The computer program product of claim 9, wherein the second VIA connects the first section and the second section at a first bend orthogonal to a first plane associated with the first section, and to a second plane associated with the second section.

11. The computer program product of claim 9, further comprising program code to position the VIAs in relation to embedded logic, wherein an area of the PCB comprises the embedded logic, and wherein the area is positioned within an enclosure to prevent tampering with the embedded logic.

12. The computer program product of claim 11, further comprising program code to position the first VIA outside of the enclosure, and to position the third VIA within the enclosure.

13. The computer program product of claim 9, further comprising program code to interconnect a fourth VIA into the venting system, wherein the channel further comprises a third section extending from the third VIA to the fourth VIA, wherein the third section is at a different planar level than at least one of the first and second sections, and wherein the third VIA connects the second section and the third section at a second bend orthogonal to the second plane, and to a third plane associated with the third section.

14. A system comprising:
   a printed circuit board (PCB) comprising a first area and a second area, and at least three interconnected accesses (VIAs) bounded by oppositely disposed sides of the PCB, wherein the VIAs are positioned with respect to the first and second areas; and a venting system integrated within the PCB, the venting system comprising:
   an interconnection of the at least three VIAs; and
   a bi-planar channel spanning through the VIAs, the channel comprising at least two sections, including a first section extending from the first VIA to the second VIA and a second section extending from the second VIA to the third VIA, wherein the second VIA connects the first and second sections at a first bend orthogonal to a first plane associated with the first section, and to a second plane associated with the second section.

15. The system of claim 14, wherein each VIA functions as a vent, and wherein the channel creates an isobaric venting system.

16. The system of claim 14, further comprising:
   an enclosure to receive at least part of the PCB, wherein the first area of the PCB is positioned within the enclosure and the second area of the PCB is positioned external to the enclosure; and
   logic embedded in the first area, wherein the enclosure prevents tampering with the embedded logic, and wherein the VIAs are positioned in relation to the embedded logic.

17. The system of claim 16, further comprising the first VIA positioned outside of the enclosure, and the third VIA positioned within the enclosure.

18. The system of claim 16, further comprising a sensor embedded in the first area to detect unwanted access to the embedded logic.

19. The system of claim 14, further comprising a fourth VIA interconnected into the venting system, wherein the channel further comprises a third section extending from the third VIA to the fourth VIA, and wherein the third section is at a different planar level than at least one of the first and second sections.

20. The system of claim 19, wherein the third VIA connects the second section and the third section at a second bend orthogonal to the second plane, and to a third plane associated with the third section.

* * * * *